(12) United States Patent
Hussain et al.

(10) Patent No.: US 8,613,228 B2
(45) Date of Patent: Dec. 24, 2013

(54) CORIOLIS MASS FLOWMETER

(75) Inventors: Yousif Hussain, Weston Favell (GB); Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 160 days.

(21) Appl. No.: 13/083,671

(22) Filed: Apr. 11, 2011

(65) Prior Publication Data

US 2012/0192658 A1 Aug. 2, 2012

(30) Foreign Application Priority Data

Feb. 2, 2011 (DE) .......................... 10 2011 010 178

(51) Int. Cl.
*G01F 1/84* (2006.01)

(52) U.S. Cl.
USPC .................................................. 73/861.355

(58) Field of Classification Search
USPC ...................................... 73/861.355, 861.356
See application file for complete search history.

(56) References Cited

U.S. PATENT DOCUMENTS

| | | | |
|---|---|---|---|
| 4,884,441 A | 12/1989 | Lew | |
| 5,044,208 A | 9/1991 | Corown et al. | |
| 5,230,254 A | 7/1993 | Craft | |
| 5,661,232 A | 8/1997 | Van Cleve et al. | |
| 5,969,264 A | 10/1999 | Rivkin | |
| 7,127,952 B2 * | 10/2006 | Bitto et al. | ............... 73/861.355 |
| 7,350,422 B2 | 4/2008 | Bitto et al. | |
| 7,360,451 B2 * | 4/2008 | Bitto et al. | ............... 73/861.355 |
| 8,316,722 B2 | 11/2012 | Bitto et al. | |
| 8,333,119 B2 | 12/2012 | Anklin-Imhof et al. | |
| 8,333,120 B2 | 12/2012 | Bitto et al. | |
| 8,336,396 B2 | 12/2012 | Bitto et al. | |
| 8,347,736 B2 | 1/2013 | Bitto et al. | |
| 2010/0050783 A1 | 3/2010 | Hussain et al. | |
| 2011/0265580 A1 | 11/2011 | Huber et al. | |

FOREIGN PATENT DOCUMENTS

| | | |
|---|---|---|
| DE | 10 2004 019 390 A1 | 11/2005 |
| DE | 10 2008 007 742 A1 | 11/2008 |
| EP | 1 319 930 A2 | 6/2003 |
| WO | 96/08697 A2 | 3/1996 |
| WO | 2006/010687 A1 | 2/2006 |
| WO | 2008/111983 A1 | 9/2008 |
| WO | 2010/103080 A1 | 9/2010 |

* cited by examiner

*Primary Examiner* — Jewel V Thompson
(74) *Attorney, Agent, or Firm* — Roberts Mlotkowski Safran & Cole, P.C.; David S. Safran

(57) ABSTRACT

A Coriolis mass flowmeter with at least four bent measuring tubes, at least one actuator assembly and at least one sensor assembly, wherein a first measuring tube and a second measuring tube are located in a common first plane and a third measuring tube and a fourth measuring tube are located in a common second plane, wherein the first plane and the second plane run parallel to one another, and wherein all four measuring tubes are joined together in terms of flow on the input side and on the output side with a collector. A Coriolis mass flowmeter for large amounts of flow, which is improved in respect to its measurement accuracy, is implemented in that the geometry and/or the surface characteristics of the measuring tubes are set so that the tube flow resistance of all four measuring tubes is identical.

12 Claims, 4 Drawing Sheets

CORIOLIS MASS FLOWMETER

BACKGROUND OF THE INVENTION

1. Field of the Invention

The invention relates to a Coriolis mass flowmeter with at least four bent measuring tubes, at least one actuator assembly and at least one sensor assembly, wherein a first measuring tube and a second measuring tube are located in a common first plane and a third measuring tube and a fourth measuring tube are located in a common second plane, wherein the first plane and the second plane run parallel to one another and wherein all four measuring tubes are joined together in terms of flow on the input side and on the output side with a collector.

2. Description of Related Art

According to the Coriolis principle, mass flowmeters have been known essentially for many years, they allow for a higher accuracy in the determination of the mass flow rate of the medium flowing through the measuring tube. In order to determine the mass flow rate, the measuring tube is excited to oscillation by an oscillation generator or also by multiple oscillation generators—in particular, a certain eigenform of an oscillation with the eigenfrequency—and the actual, resulting oscillations are detected and evaluated by oscillation sensors. The oscillation generators and the oscillation sensors are generally constructed in such a manner that they have a permanent magnet as well as a magnetic coil in order to transfer oscillations on the measuring tube or to detect oscillations of the measuring tube electrically.

The evaluation consists, for example, of determining the phase shift between each oscillation detected by the two oscillation sensors, wherein this phase shift is a direct measure for the mass flow rate. Coriolis mass flowmeters are known that have one, single measuring tube, as well as those having exactly two measuring tubes, wherein the measuring tubes are either stretched essentially straight or bent.

The measuring tubes of the mass flowmeter have very different nominal widths with different wall thicknesses depending on the amount of mass to be transported. The measuring tubes have to be configured in such a manner that they can withstand the required pressures and occurring mechanical tension, that they can be excited to an easily detectable oscillation with reasonable energy expenditure and the eigenfrequency of the measuring tube with flowing medium lies in a desired range.

German Patent Applicaton DE 10 2004 035 971 A1 and corresponding International Patent Application Publication WO 2006/010687 A1 disclose a Coriolis mass flowmeter with four bent measuring tubes, wherein the measuring tubes can each be supplied in pairs in direct flow or in reverse flow with a fluid whose mass flow is to be determined. The four measuring tubes are optionally, in units of two measuring tubes, arranged next to one another or above one another and can be commonly excited to opposing oscillations. Parts of an actuator or sensor assembly are affixed to a pair of measuring tubes, so that the measuring tubes can be excited to oscillation and the excited oscillations can be detected by the sensor assembly. In the arrangement, in which the measuring tubes are arranged above one another in pairs, the lower measuring tube is designed somewhat larger in order to span the longer path between input and output.

SUMMARY OF THE INVENTION

Based on the prior art mentioned above, a primary object of the invention is to provide a Coriolis mass flowmeter for large amounts of flow, which is improved in respect to measurement accuracy.

The above object is met with a Coriolis mass flowmeter of the type described here in that the geometry and/or the surface characteristics of the measuring tube are chosen in such a manner that the tube resistance of all four measuring tubes is identical for a flow.

The four measuring tubes of the Coriolis mass flowmeter are preferably bent to be either U-shaped or V-shaped and extend between the collectors arranged on both ends. The horizontal spacing between the two collectors is of equal length for all measuring tubes. The measuring tubes that lie in a common, preferably vertical plane are consequently arranged over one another. Preferably, the spacing between measuring tubes remains constant over the entire length between the collectors so that the measuring tubes run parallel to one another, and in particular, the center line of the measuring tubes arranged above one another have a constant spacing relative to one another.

That each two measuring tubes lie in one plane, namely the first measuring tube and the second measuring tube, or respectively, the third measuring tube and the fourth measuring tube means that each of the two measuring tubes as a measuring tube pair are arranged one above the other, namely advantageously so that the first measuring tube pair can oscillate opposite to the second measuring tube pair during operation of the Coriolis mass flowmeter and measured values can be detected. In an arrangement, in which the measuring tubes lying in one plane have the same diameter, preferably the center lines of both of the measuring tubes lie in a common plane. However, it is also possible for to use measuring tubes that do not have a common diameter. In particular, in arrangements having different diameters, for example, the outer circumferences lie on one side—preferably on the side facing the second measuring tube pair—of the measuring tubes in one plane, so that the gap—the oscillation gap—is constant between the measuring tube pairs for all measuring tubes.

The openings of the four measuring tubes terminate at each end in a respective collector, which merges the measuring tubes in terms of flow. Due to the common collector at both ends of the measuring tube, the pressure is identical at the entrance for all measuring tubes and also the pressure is identical at the exit for all measuring tubes. The pressure difference between entrance pressure and exit pressure is, during operation, dependent on a plurality of parameters of the fluid and the Coriolis mass flowmeter, in particular the measuring tubes.

The geometry and/or the surface characteristics of the measuring tube are chosen according to the invention so that, preferably, at the optimum operation point of each Coriolis mass flowmeter, the tube resistance in respect to flow of all four measuring tubes is identical for the flow. This means that, in particular, in all four measuring tubes, the same volume flow is set at the optimum operation point. The operation point or the operation parameter for which the Coriolis mass flowmeter is suitable and designed is meant by the optimum operation point.

In addition to the influence due to the characteristics of the fluid flowing within a pipeline—which are the same for all measuring tubes due to the collector—the flow of a fluid within a pipeline is influenced significantly by the surface characteristics of the pipeline itself and the geometry of the pipeline, in particular the diameter, the length and the number and the bending radius of arches provided within the pipeline. According to the invention, consequently, all four measuring tubes of the Coriolis mass flowmeter are designed so that each measuring tube opposes the flow with an essentially identical resistance so that—in particular, at a loss of pressure due to the collector—the same volume flow is reached in all four pipelines.

In respect to the geometry of the measuring tube, the overall length, the diameter or the number and course of the arches of the pipeline can be adapted—in particular also taking the fluid characteristics into consideration at the operation point or operation window of the Coriolis mass flowmeter. In respect to the surface characteristics of the measuring tube, the surface roughness of the measuring tubes on the inner surface coming into contact with the flow is of particular importance. According to the teaching of present invention, the different pipe resistances caused, for example, due to different lengths of the bent measuring tubes are compensated for flow by specific choice and adaptation of other parameters, such as, e.g., diameter and surface quality, so that the same tube resistance is prevalent for all measuring tubes, as is the case, for example, in Coriolis mass flowmeters having four straight—identical—measuring tubes.

A first design of the Coriolis mass flowmeter has been seen to be particularly advantageous, in which the measuring tubes lying in a common plane are designed in such a manner that they have the same length. The overall length of all four measuring tubes, i.e., the path spanned from the center line of a measuring tube, is consequently identical in this design. In order to achieve an identical tube resistance, here, for the flow, the diameter and the surface characteristics of all four measuring tubes are also preferably identical. An identical length of the measuring tubes can, for example, be achieved in that the length of one or multiple measuring tubes is chosen to be specifically longer than is necessary for connecting the collectors, i.e., for example, is extended. This, depending on the design, in particular, the choice of the number and radii of the arches, has the consequence that the measuring tubes lying in one plane no longer necessarily run parallel over the entire path between the collectors, but rather can have varying spacing.

The length of the measuring tubes can be particularly advantageously influenced and designed to be the same, in that the bending radii of the measuring tubes located in a common plane alternately complement one another, so that the length of the measuring tubes is identical. "Alternately complement" here means that the sum of the paths being spanned with a certain radius in view of the overall length of both measuring tubes running in one plane is the same for both measuring tubes. The different lengths of the individual paths of the measuring tubes caused by the different bending radii are compensated in such a manner that the two measuring tubes located in a common plane run completely parallel with constant spacing relative to one another, while the length of the measuring tubes, and in particular, the length of the center line of the measuring tubes is completely identical. This design has the advantage that—at a same diameter of the measuring tubes and the same length construed by the bending radii—every measuring tube opposes the flow with the same tube resistance. The bending radii correspond to one another preferably in such a manner that the bending radius of the measuring tube running further outside in terms of flow, i.e., the measuring tube that has to span the greater path, corresponds to the bending radius of the measuring tube running on the inside with further additional spacing between the measuring tubes and additional tube radius.

As an alternative to a design in which the length of the measuring tubes is exactly identical, identical tube resistance can be created according to a further design in which the measuring tubes located in a common plane have different lengths, wherein the diameter of the longer measuring tube is greater than the diameter of the shorter measuring tubes in order to adjust the tube resistances. The essentially, in comparison, shorter measuring tube—at same other parameters—is compensated with the longer measuring tube due to the increased tube resistance of greater length in that the diameter is slightly greater so that the difference of the tube resistance, i.e., the disadvantage of the greater length is compensated by the greater diameter. The choice of diameter of the measuring tube in the scope of the construction of the Coriolis mass flowmeter occurs preferably taking the fluid characteristics into account and taking the operating parameters of the Coriolis mass flowmeter into account.

Alternatively or additionally to the features of the designs described above, it is provided according to a further design that the measuring tubes located in a common plane have different lengths, wherein the inner surface of the shorter measuring tubes and/or the longer measuring tubes is chosen in respect to roughness so that the tube resistance of both measuring tubes are identical for a flow. In this design—as in that described above—one of the two measuring tubes joined together to a measuring tube pair is consequently slightly longer than the other measuring tube so that a compensation of the tube resistance is necessary. In order to compensate the tube resistance for a flow, the surface texture of the slightly longer measuring tube of the measuring tube pair is chosen in such a manner that the measuring tube has a same flow resistance as the shorter measuring tube, despite the longer overall length. This design is suitable for Coriolis mass flowmeters in which the optimum operating point lies in the range of a laminar flow, since the influence of the surface roughness on the tube resistance is particularly large at a laminar flow. Preferably, the diameter as well as the surface texture are chosen simultaneously as a variable for the slightly longer measuring tubes and adjusted in order to compensate the tube resistance for all of the measuring tubes.

According to a further advantageous design of the Coriolis mass flowmeter, it is provided that holding devices are provided for affixing the actuator and/or the sensor assembly to the measuring tubes, wherein a holding device joins the measuring tubes located in a plane to one another in the mounted state, wherein, in particular, a holding device completely encircles a measuring tube. Preferably, even both center lines of the measuring tubes that are joined together with a holding device are located in a common plane. The holding devices are, for example, manufactured from one sheet so that it is guaranteed in the mounted state that the measuring tubes joined together by the holding devices do not oscillate relative to one another. The holding devices have holes with which they can be pushed onto the two measuring tubes located in one plane. The inner diameter of a hole corresponds, here, to the outer diameter of a measuring tube, wherein the holding device can be affixed to the measuring tubes, for example, force-fit, form-fit or firmly bonded. At least one part of an actuator and/or sensor assembly is affixed to a holding device, wherein a complete actuator or sensor assembly consists of two opposingly arranged parts, each affixed to a holding device that interact in the mounted state. Normally, these two parts of an actuator or sensor arrangement are a permanent magnet and a magnetic coil, into which the permanent magnet dips. The two parts are arranged here correspondingly in such a manner that they interact between the two measuring tube pairs, which are each joined together by the holding device.

A particular stability of the holding device, which prevents relative oscillation between the two measuring tubes joined together with a holding device, can be achieved when the holding devices are designed according to a further design so that the holding devices for the actuator or sensor assembly are designed symmetrically, in particular, are designed symmetrically in respect to at least two planes orthogonal to one another. The holding device obtains an advantageous torsional stiffness from this symmetry, which reliably prevents relative movement of the measuring tube joined together by the holding device. Each holding device on the measuring tubes represents an additional mass during operation that oscillates with the measuring tubes. The mass is evenly distributed due to a symmetrical design of the holding device, so that no parasitic oscillation can be created by asymmetrically oscillating masses. The symmetry of the holding device is preferably provided in respect to a plane which contains the center lines of both of the measuring tubes joined to one another. The second plane of symmetry is preferably a plane that is orthogonal to the first plane and runs parallel to the center line of the measuring tubes, exactly halfway through the path between the measuring tube center lines.

In particular, for fluids within the Coriolis mass flowmeter that severely dampen the oscillations of the measuring tubes, it has been shown to be advantageous when a part of an actuator or sensor assembly is attached to a holding device above and below the two measuring tubes joined by the holding device. Since, for example, an actuator assembly is provided above and below the measuring tubes, a greater excitation energy is available for exciting the oscillations of the measuring tubes, so that, in particular, in severe oscillation-absorbing limiting conditions, a sufficient oscillation can be excited for detecting the mass flow. A further advantage of the double actuator assembly is that the measuring tubes are excited advantageously momentum-free, so that no torsional parasitic oscillations of the measuring tube pairs are excited, rather a defined excitation energy is applied to both sides of the measuring tubes that only excites oscillation in a preferred oscillation plane.

In the case that a part of a sensor assembly is provided on the holding device above and below the measuring tubes joined by the holding device, and thus, a sensor assembly is provided between the measuring tube pairs above and below the measuring tubes, there is an advantage that possible imprinted or present torsional oscillations of the measuring tube pairs toward one another are evaluated by a comparison evaluation of the measuring signals of the top and the bottom sensor assembly and the measuring signals can thus be adjusted from this parasitic oscillation.

The coupling of parasitic oscillations that emanate from the piping system surrounding the Coriolis mass flowmeter can be prevented in that, on each of the input side and output side, two node plates are provided spaced from one another, which join all four measuring tubes to one another, in particular, the node plates are designed symmetrically. The node plates are each attached at the end sections of the measuring tubes to all four measuring tubes, so that the measuring tubes cannot move relative to one another. A second node plate is provided at a defined spacing relative to the first node plate for further prevention of the propagation of parasitic oscillations, which also joins all four measuring tubes to one another and is attached thereto. In addition to the coupling of parasitic oscillations, the node plates prevent the de-coupling of the oscillations created by the actuator assembly on the piping system surrounding the Coriolis mass flowmeter.

The measuring accuracy of the Coriolis mass flowmeter can be additionally increased according to a further design in that the collectors provided on the input side and the output side are designed in a manner that is sturdy so that the fulfill the function of a node plate. The measuring tubes that are joined together in terms of flow in the collectors are attached to the collectors so that the collectors reliably prevent a movement of the four measuring tubes relative to one another and dampen oscillations.

The transfer of oscillations onto the housing is prevented in that a reinforcing element is provided within the housing of the Coriolis mass flowmeter, wherein the reinforcing element has an arch-shaped course, which runs opposite the arch-shaped course of the measuring tubes. The measuring tubes are preferably bent into a U- or V-shape and extend within the housing. The reinforcing element is preferably also designed with a U- or V-shape, however arranged opposing the arch-shaped course of the measuring tube and attached to the walls of the housing. The Coriolis mass flowmeter can further be designed with substantially thinner walls and thus lighter due to the reinforcing element, wherein a sufficient stability is guaranteed by the reinforcing element. The reinforcing element is preferably designed as a solid part, or particularly preferred, built as a welded hollow frame construction.

The welded hollow frame construction has the further advantage that a closed volume is formed within the reinforcing element, as according to a further development, wherein, in particular, a heat transfer medium can be led into the reinforcing element.

A heat transfer medium can be led through the closed volume in the reinforcing element, with which, for example, the inner space of the housing of the Coriolis mass flowmeter can be heated or cooled, which is necessary inside of the measuring tube, in particular, for temperature-sensitive media. A further field of application is, for example, the heating of the measuring tube for fluids, which otherwise are not able to flow within the measuring tube or even solidify therein. The heat transfer medium is introduced, here, into the reinforcing element on one side of the volume and—after either absorbing or releasing energy—lead out of the volume again for regeneration. Thus, two functions are simultaneously fulfilled by the reinforcing element construction.

In detail, there are a number of possibilities for designing and further developing the Coriolis mass flowmeter. Here, please refer to the following detailed description of preferred embodiments in conjunction with the accompanying drawings.

DETAILED DESCRIPTION OF THE INVENTION

Figure 1:
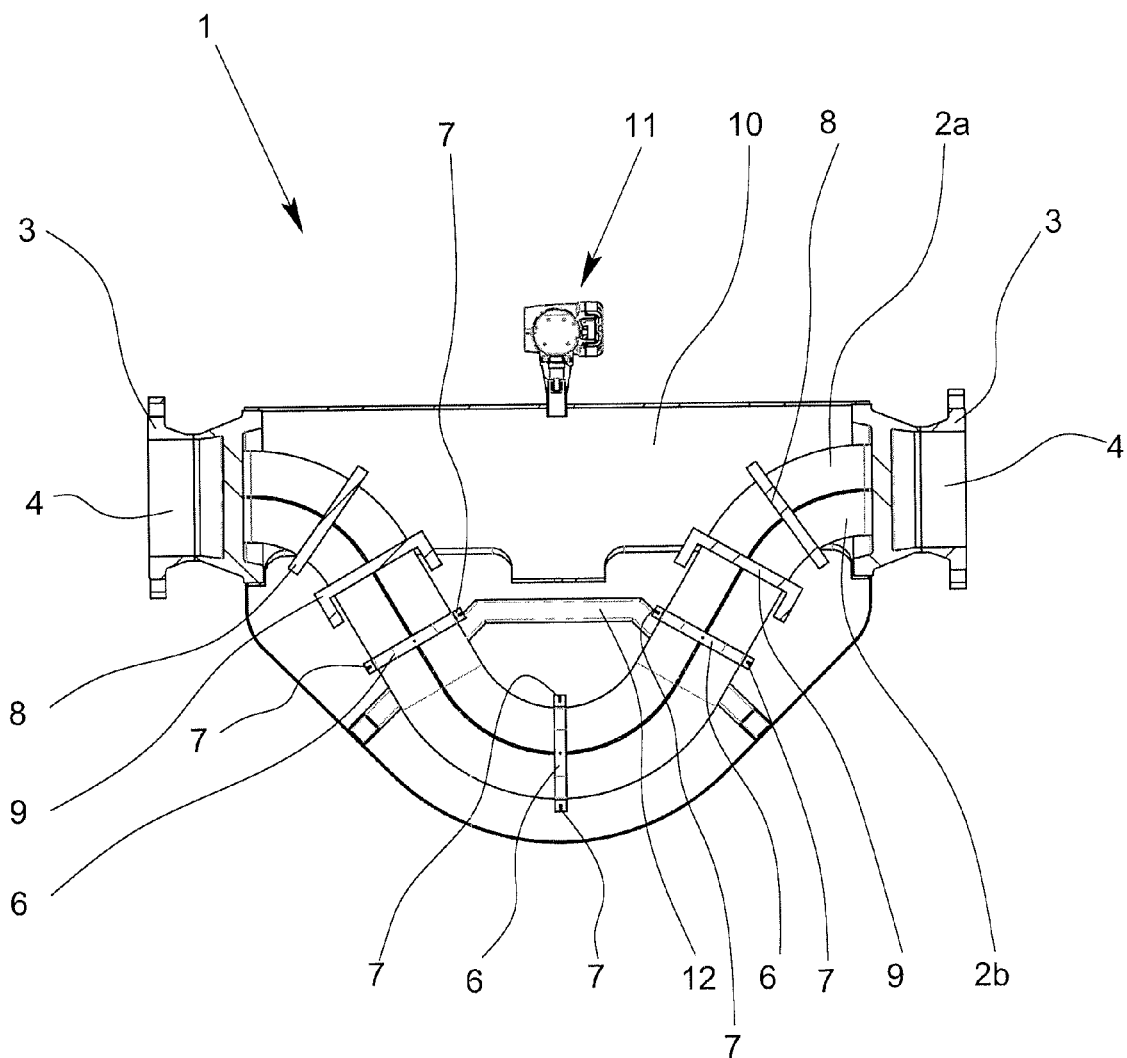
FIG. 1 shows an embodiment of a Coriolis mass flowmeter in a sectional side view.
Figure 4:
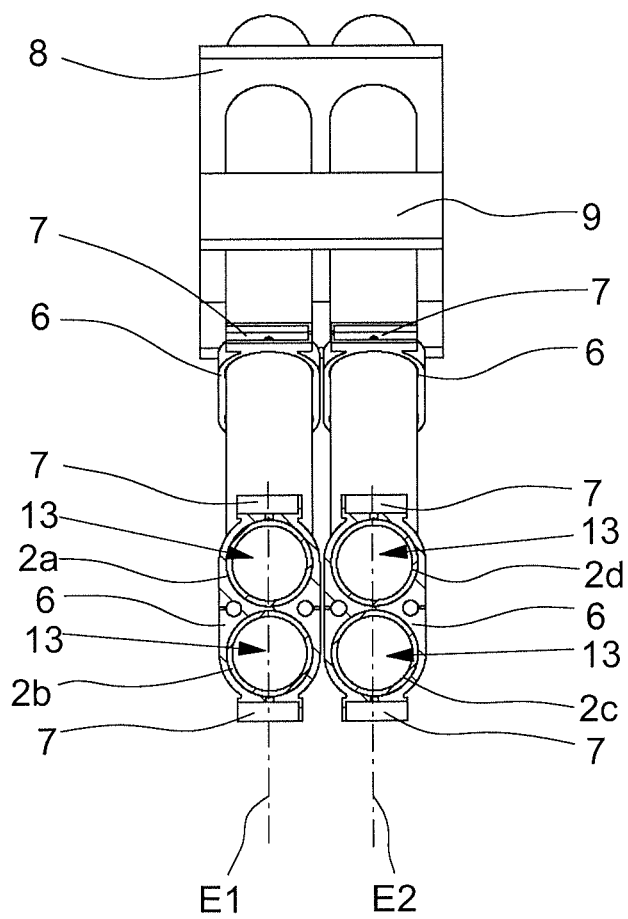
FIG. 4 shows an embodiment of the measuring tubes for a Coriolis mass flowmeter with actuator and sensor assemblies arranged on both sides, in a sectional view.

FIG. 1 shows an embodiment of a Coriolis mass flowmeter 1 having a total of four bent measuring tubes 2a, 2b, 2c, 2d are arranged within the Coriolis mass flowmeter. As shown in FIG. 4, a first measuring tube 2a and a second measuring tube 2b lie in a common first plane $E_1$ and a third measuring tube 2c and a fourth measuring tube 2d in a common second plane $E_2$. In the embodiment according to FIG. 4, the center line of each of the measuring tube pairs 2a, 2b, and 2c, 2d lies in the respective common plane $E_1$, $E_2$. The first plane $E_1$ and the second plane $E_2$ are arranged parallel to one another.

As shown in FIG. 1, all four measuring tubes 2a, 2b, 2c, 2d are joined together on the input side and the output side with a collector 3. The collectors 3 have a chamber 4, into which each of the openings of the four measuring tubes 2a, 2b, 2c, 2d open. In the Coriolis mass flowmeter according to FIG. 1, the geometry and the surface characteristics of the four measuring tubes 2a, 2b, 2c, 2d are chosen so that the tube flow resistance of all four measuring tubes 2a, 2b, 2d, 2d are identical. In particular, in the Coriolis mass flowmeter 1 according to FIG. 1, all four measuring tubes 2a, 2b, 2c, 2d have the same length, which achieves that the—shown in FIG. 2—bending radii $R_1$, $R_2$ of the four measuring tubes 2a, 2b, 2c, 2d complement each other alternately (tube 2a has radii $R_2$ $R_1$, $R_2$ while tube 2b has radii $R_1$ $R_2$, $R_1$) in such a manner that the overall length of all four measuring tubes 2a, 2b, 2c, 2d is identical.

Figure 2:
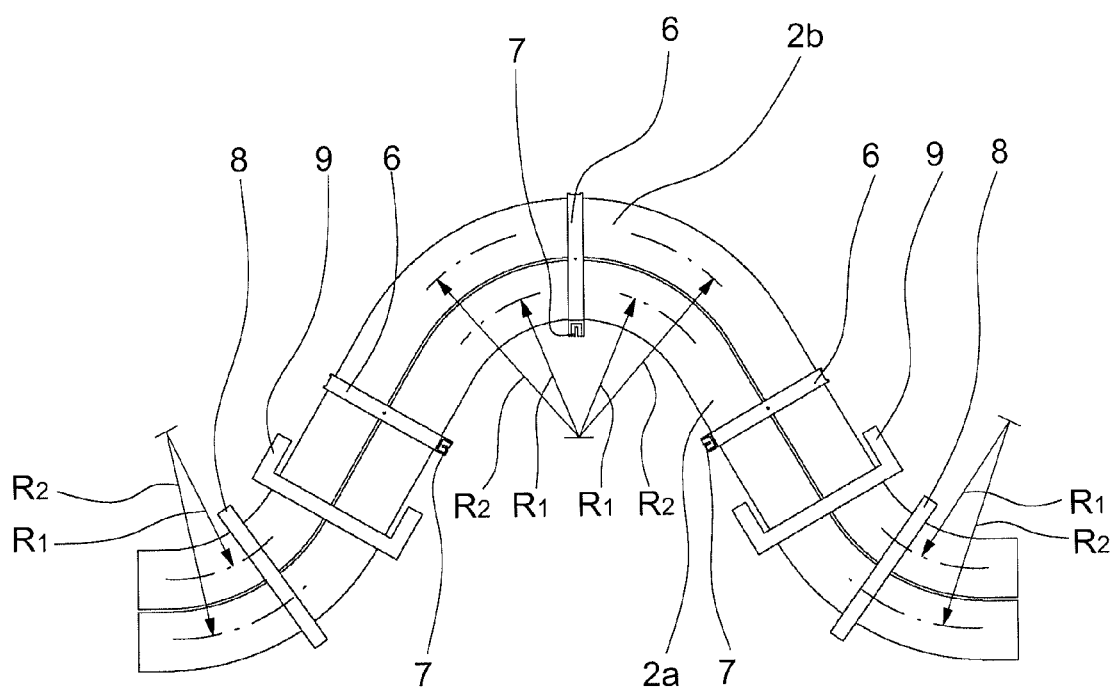
FIG. 2 shows the measuring tubes of a Coriolis mass flowmeter according to FIG. 1 in a side view.

In particular, as FIG. 2 shows, the measuring tube 2a, 2b, 2c, 2d of the embodiment according to FIG. 1 in an optional representation in a side view. The bending radii $R_1$, $R_2$, which are each found in one plane $E_1$, $E_2$ for the measuring tubes 2a, 2b and 2c, 2d, complement each other alternately in this embodiment. "Alternately complement" here means that each of the four measuring tubes 2a, 2b, 2c, 2d in the path between the two—shown in FIG. 1—collectors 3 spans a bent course with a certain number and defined path with the bending radii $R_1$, $R_2$. For example, the first measuring tube 2a begins in this manner—in FIG. 2 looking from left to right—with an arch-shaped section with the radius $R_2$, then, two arch-shaped sections follow with the radius $R_1$ and finally—on the right side of FIG. 2—an arch-shaped course with the radius $R_2$. The second measuring tube 2b begins—on the left side of FIG. 2—with an arch-shaped section with the radius $R_1$, then with two arch-shaped sections with the radius $R_2$ and ends—on the right side of FIG. 2—with an arch-shaped section with the radium $R_1$. Both measuring tubes 2a, 2b thus span in their path between both collectors 3 each two arch-shaped sections with the radius $R_1$ and each two arch-shaped sections with the radius $R_2$, wherein the bending radii $R_1$, $R_2$ complement each other alternately in such a manner that in one section where the first measuring tube 2a has an arch-shaped course with a radius $R_2$, the second measuring tube 2b has an arch-shaped course with a radius $R_1$—and vice versa, so that overall, the entire length of both measuring tubes 2a, 2b is identical. The same holds true for the course of the third measuring tube 2c with the fourth measuring tube 2c in the plane $E_2$.

Figure 3:
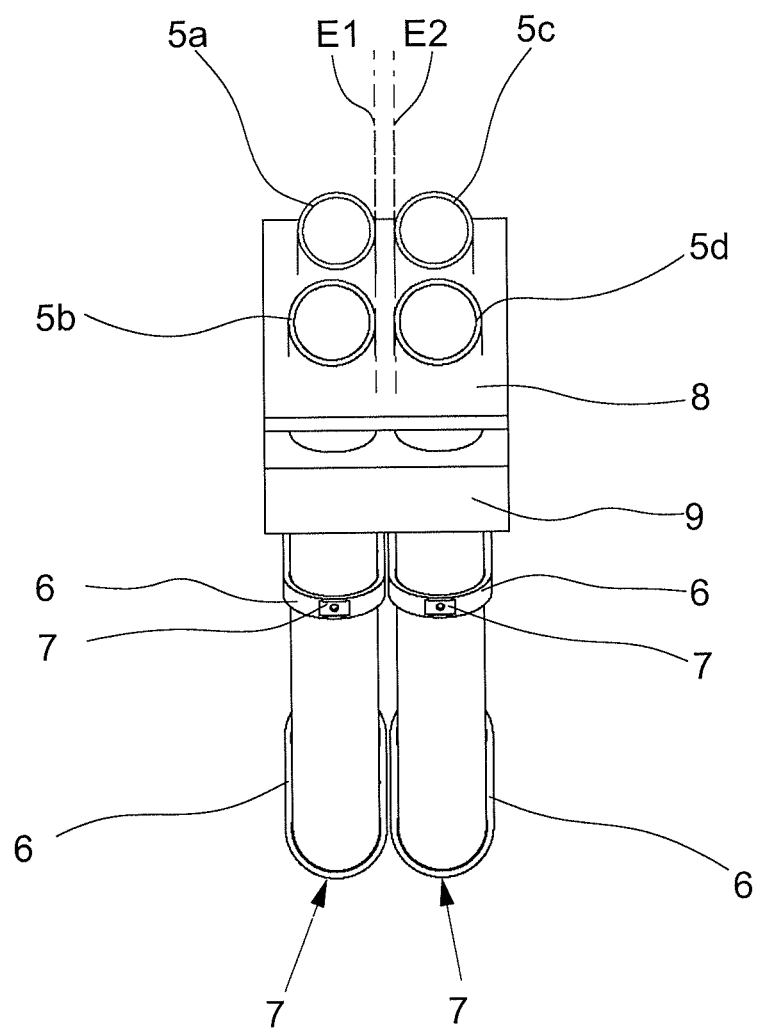
FIG. 3 shows an embodiment of the measuring tubes of a Coriolis mass flowmeter in a front view.

FIG. 3 shows an embodiment of measuring tubes 5a, 5b, 5c, 5d for a Coriolis mass flowmeter 1 in which each of a longer measuring tube 5b, 5d is arranged in a common plane $E_1$, $E_2$ with a shorter measuring tube 5a, 5c. The shorter measuring tube 5a is arranged with the longer measuring tube 5b in a first plane $E_1$ and the longer measuring tube 5d is arranged in a second plane $E_2$ with the shorter measuring tube 5c. In order to adjust the tube resistances of all four of the measuring tubes 5a, 5b, 5c, 5d, the diameter of the longer measuring tube 5b, 5d is greater than the diameter of the shorter measuring tube 5a, 5c. In addition to the diameter of the measuring tubes 5a, 5b, 5c, 5d, the inner surface of the measuring tubes 5a, 5b, 5c, 5d in respect to the surface roughness is also chosen so that the tube flow resistance of all measuring tubes 5a, 5b, 5c, 5d is identical. Setting a same tube resistance for a flow for all measuring tubes 5a, 5b, 5c, 5d in this embodiment is a complex interplay of the two parameters, i.e., roughness of the inner surface and the diameter of the measuring tubes.

Holding devices 6 are provided on the measuring tubes 5a, 5b, 5c, 5d in order to attach the actuator and/or sensor arrangement—not shown—which join the measuring tubes together that lie in one plane $E_1$, $E_2$. A part of an actuator or sensor assembly can be attached to the narrow side 7 of a holding device. In the input side and output side end sections, all four measuring tubes 5a, 5b, 5c, 5d are joined to one another with a first node plate 8 and with a second node plate 9 in order to prevent that the oscillations of the measuring tubes 5a, 5b, 5c, 5d of the Coriolis mass flowmeter 1 are transferred onto the piping system—not shown—surrounding the Coriolis mass flowmeter 1. According to FIG. 2, the first node plate 8 is designed as a flat sheet, while the second node plate 9 has angled extensions in its side sections.

According to FIG. 1, the measuring tubes 2a, 2b, 2c, 2d are arranged within a housing 10 of the Coriolis flowmeter 1. Measuring and evaluating electronics 11—not described further in detail—are also arranged on the housing 10. The housing is attached to the collectors 3 and completely surrounds the measuring tubes 2a, 2b, 2c, 2d. In order to increase the stiffness of the housing 10, a reinforcing element 12 is provided that has an arch-shaped course, that opposes the arch-shaped course of the measuring tubes 2a, 2b, 2c, 2d. The reinforcing elements serve to prevent the housing 10 from co-oscillating and, to simultaneously be able to reduce the material strength of the walls of the housing 10. The reinforcing element 12 is designed as a welded hollow frame construction so that a closed volume is formed within the reinforcing element 12, into which a heat transfer medium can be led. This allows for the inner volume of the housing 10, and in particular, the measuring tubes 2a, 2b, 2c, 2d, for example, to be heated or cooled.

According to the embodiment in FIG. 1, a part of an actuator or sensor assembly can be attached to the holding device 6 each side of the front end 7. The arrangement of parts of an actuator or sensor assembly on both sides of the measuring tubes 2a, 2b, 2c, 2d has the advantage that the measuring tubes 2a, 2b, 2c, 2d can be uniformly excited with a high excitation energy, wherein a compensation of possibly occurring torsional oscillation is possible with sensor arrangements being arranged on both sides.

In FIG. 4, a sectional representation is shown through the holding device 6 for the actuator assembly—not shown. A part of an actuator assembly can be attached onto both front ends 7 of the holding device 6, so that each of two parts of an actuator assembly on two holding devices 6 can interact with one another during operation. The holding devices 6 are designed as solid sheet metal parts and arranged symmetrically in respect to two planes orthogonal to one another. A symmetry of the holding devices 6 is present, for example, relative to both planes $E_1$ and $E_2$ and additionally to a further plane, which runs orthogonal to the planes $E_1$ and $E_2$, exactly in the middle between the holes 13 of the holding devices 6. The holding devices 6 are arranged in such a solid manner that a relative oscillation of the measuring tubes 2a, 2b, or 2c, 2d arranged in a common plane $E_1$, $E_2$ is not possible.

What is claimed is:

1. Coriolis mass flowmeter, comprising:
at least four bent measuring tubes having an inner surface with a predefined geometry and surface characteristics at least one actuator assembly and at least one sensor assembly,
a first measuring tube and a second measuring tube located in a common first plane, a third measuring tube and a fourth measuring tube located in a common second plane that is parallel to said common first plan,
and a respective flow collector joining all four of said measuring tubes together at a flow input end and at a flow output end thereof, wherein each flow collector has a chamber into which openings of all four of the measuring tubes open, wherein at least one of the geometry and the surface characteristics of the inner surface of the measuring tubes has been set to produce a tube flow resistance of all four measuring tubes that is identical, and wherein said at least four bent measuring tubes are all bent in the same directions.

2. Coriolis mass flowmeter according to claim 1, wherein the measuring tubes located in the common first plane have the same length and the measuring tubes located in the common second plane have the same length.

3. Coriolis mass flowmeter according to claim 2, wherein the bending radii of the measuring tubes located in each of the common first and second planes alternately complement one another so that the length of the measuring tubes in the respective plane is identical.

4. Coriolis mass flowmeter according to claim 1, wherein the measuring tubes located in the common first plane have different lengths and the measuring tubes located in the common second plane have different lengths, wherein the diameter of a longer of measuring tubes in each plane is greater than the diameter of the shorter measuring tubes by an amount acting to equalize the tube flow resistances.

5. Coriolis mass flowmeter according to claim 1, wherein the measuring tubes located in the common first plane have different lengths and the measuring tubes located in the common second plane have different lengths, wherein the inner surface of at least one of the shorter of the measuring tubes and the longer measuring tubes in each plane has a roughness acting to equalize the tube flow resistances.

6. Coriolis mass flowmeter according to claim 1, wherein holding devices are provided for affixing at least one the at least one actuator assembly and the at least one sensor assembly to the measuring tubes, the holding devices joining the measuring tubes located in each said plane to one another.

7. Coriolis mass flowmeter according to claim 6, wherein the holding devices are symmetrical in respect to at least two planes that are orthogonal to one another.

8. Coriolis mass flowmeter according to claim 6, wherein a part of the respective actuator assembly or sensor assembly is attached to a respective holding device above and below the measuring tubes joined by the holding device.

9. Coriolis mass flowmeter according to claim 1, further comprising node plates joining all four measuring tubes together on each of the input side and the output side thereof, the node plates being spaced apart from one another.

10. Coriolis mass flowmeter according to claim 9, wherein the collectors form the node plates.

11. Coriolis mass flowmeter according to claim 1, wherein a reinforcing element is located within a housing of the Coriolis mass flowmeter, wherein the reinforcing element has an arch-shape which runs opposite to an arch-shaped portion of the measuring tubes at which it is attached.

12. Coriolis mass flowmeter according to claim 11, wherein a closed volume is formed inside of the reinforcing element, and wherein a heat transfer medium is circulatable through the reinforcing element.

\* \* \* \* \*